(12) United States Patent
Melick et al.

(10) Patent No.: US 8,270,452 B2
(45) Date of Patent: Sep. 18, 2012

(54) METHOD AND APPARATUS FOR MULTI-BAND UWB COMMUNICATIONS

(75) Inventors: Bruce D. Melick, Cedar Rapids, IA (US); David M. Snyder, Cedar Rapids, IA (US); Leslie D. Baych, Cedar Rapids, IA (US); Gregory P. Probst, Iowa City, IA (US); Philip T. Kennedy, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 1568 days.

(21) Appl. No.: 11/118,928

(22) Filed: Apr. 29, 2005

(65) Prior Publication Data

US 2005/0254554 A1   Nov. 17, 2005

Related U.S. Application Data

(63) Continuation-in-part of application No. 10/427,039, filed on Apr. 30, 2003, now Pat. No. 7,376,191, and a continuation-in-part of application No. 10/967,850, filed on Oct. 18, 2004.

(60) Provisional application No. 60/376,592, filed on Apr. 30, 2002, provisional application No. 60/441,348, filed on Jan. 20, 2003, provisional application No. 60/512,367, filed on Oct. 17, 2003.

(51) Int. Cl.
*H04B 1/00* (2006.01)

(52) U.S. Cl. ........ 375/130; 375/211; 375/220; 375/260; 375/267

(58) Field of Classification Search .................. 375/211, 375/219, 220, 260, 267; 370/203–211
See application file for complete search history.

(56) References Cited

U.S. PATENT DOCUMENTS

| | | | |
|---|---|---|---|
| 3,818,117 A | 6/1974 | Reyner | |
| 4,641,317 A | 2/1987 | Fullerton | |
| 4,813,057 A | 3/1989 | Fullerton | |
| 4,979,186 A | 12/1990 | Fullerton | |
| 5,363,108 A | 11/1994 | Fullerton | |
| 5,418,721 A | 5/1995 | Arai | |
| 5,677,927 A * | 10/1997 | Fullerton et al. | 375/130 |

(Continued)

FOREIGN PATENT DOCUMENTS

EP   0963066 A1   12/1999

(Continued)

OTHER PUBLICATIONS

Pulse Link, Inc. "Ultra Wideband Over Cable Technologies: Enhancing Cable Television Bandwidth Capacity Without Modification to Existing Infrastructure." 2002.

(Continued)

*Primary Examiner* — Curtis Odom

(74) *Attorney, Agent, or Firm* — McKee, Voorhees & Sease, P.L.C.

(57) ABSTRACT

A method and device for transmitting information over a first medium include allocating for signal transmission, each of a plurality of frequency sub-bands of an ultra-wide band spectrum and sending over the first medium an ultra-wide band transmission including the information. The ultra-wide band transmission is performed by sending a signal over each of the plurality of frequency sub-bands. Each signal may be encoded, modulated and/or multiplexed. The information which is transmitted may be obtained from a second signal transmission received over a second medium.

10 Claims, 16 Drawing Sheets

U.S. PATENT DOCUMENTS

| | | | |
|---|---|---|---|
| 5,687,169 | A | 11/1997 | Fullerton |
| 5,758,085 | A | 5/1998 | Kouoheris |
| 5,832,035 | A | 11/1998 | Fullerton |
| 5,982,276 | A | 11/1999 | Stewart |
| 5,995,534 | A | 11/1999 | Fullerton |
| 6,111,356 | A | 8/2000 | Roitman |
| 6,133,912 | A | 10/2000 | Montero |
| 6,148,414 | A | 11/2000 | Brown |
| 6,177,903 | B1 | 1/2001 | Fullerton et al. |
| 6,185,290 | B1 | 2/2001 | Shaffer et al. |
| 6,195,484 | B1 | 2/2001 | Brennan, III et al. |
| 6,218,979 | B1 | 4/2001 | Barnes et al. |
| 6,236,652 | B1 | 5/2001 | Preston et al. |
| 6,430,208 | B1 | 8/2002 | Fullerton et al. |
| 6,437,832 | B1 | 8/2002 | Grabb et al. |
| 6,496,104 | B2 | 12/2002 | Kline |
| 6,505,032 | B1 * | 1/2003 | McCorkle et al. ........... 455/41.2 |
| 6,532,256 | B2 | 3/2003 | Miller |
| 6,532,260 | B2 | 3/2003 | Oi |
| 6,781,530 | B2 | 8/2004 | Moore |
| 6,782,048 | B2 | 8/2004 | Santhoff |
| 6,834,073 | B1 | 12/2004 | Miller et al. |
| 6,868,419 | B1 | 3/2005 | Melick |
| 6,928,268 | B1 * | 8/2005 | Kroner ............................ 455/69 |
| 6,976,034 | B1 | 12/2005 | Melick et al. |
| 7,013,145 | B1 | 3/2006 | Centore |
| 7,020,073 | B2 * | 3/2006 | Kadous et al. ................. 370/208 |
| 7,068,715 | B2 * | 6/2006 | Hoctor et al. ................. 375/239 |
| 7,376,191 | B2 | 5/2008 | Melick et al. |
| 7,512,185 | B2 | 3/2009 | Sharon et al. |
| 2001/0036183 | A1 | 11/2001 | Melick et al. |
| 2001/0049740 | A1 | 12/2001 | Karpoff |
| 2001/0053175 | A1 | 12/2001 | Hoctor et al. |
| 2002/0018514 | A1 | 2/2002 | Haynes |
| 2002/0024423 | A1 | 2/2002 | Kline |
| 2002/0064245 | A1 * | 5/2002 | McCorkle ..................... 375/346 |
| 2002/0076193 | A1 | 6/2002 | Melick |
| 2002/0097790 | A1 | 7/2002 | Dress, Jr. et al. |
| 2003/0095063 | A1 | 5/2003 | Fullerton |
| 2003/0099299 | A1 * | 5/2003 | Rogerson et al. ............. 375/253 |
| 2003/0202537 | A1 | 10/2003 | Rogerson et al. |
| 2003/0228005 | A1 | 12/2003 | Melick et al. |
| 2004/0008617 | A1 * | 1/2004 | Dabak et al. ................. 370/208 |
| 2004/0008729 | A1 | 1/2004 | Rogerson et al. |
| 2004/0028011 | A1 | 2/2004 | Gehring et al. |
| 2004/0032354 | A1 | 2/2004 | Knobel et al. |
| 2004/0048574 | A1 * | 3/2004 | Walker et al. ................. 455/63.1 |
| 2004/0077306 | A1 | 4/2004 | Shor et al. |
| 2004/0131130 | A1 | 7/2004 | Shor et al. |
| 2004/0141561 | A1 | 7/2004 | Santhoff et al. |
| 2004/0151109 | A1 * | 8/2004 | Batra et al. .................... 370/208 |
| 2004/0156335 | A1 | 8/2004 | Brethour et al. |
| 2004/0178934 | A1 | 9/2004 | Balakrishnan et al. |
| 2004/0233973 | A1 | 11/2004 | Fullerton et al. |
| 2004/0247020 | A1 | 12/2004 | Mills et al. |
| 2004/0258133 | A1 | 12/2004 | Lee et al. |
| 2005/0013386 | A1 | 1/2005 | Ojard |
| 2005/0018751 | A1 | 1/2005 | Roy et al. |
| 2005/0058114 | A1 * | 3/2005 | Santhoff et al. ............... 370/343 |
| 2005/0069020 | A1 | 3/2005 | Lakkis |
| 2005/0089083 | A1 | 4/2005 | Fisher et al. |
| 2005/0131922 | A1 | 6/2005 | Kennedy et al. |
| 2005/0180369 | A1 | 8/2005 | Hansen et al. |
| 2005/0240607 | A1 | 10/2005 | Melick et al. |
| 2007/0022444 | A1 | 1/2007 | Santhoff |
| 2007/0025738 | A1 | 2/2007 | Moore |
| 2007/0058693 | A1 | 3/2007 | Aytur et al. |
| 2007/0147386 | A1 | 6/2007 | Choi et al. |
| 2007/0248174 | A1 | 10/2007 | Ghosh et al. |

FOREIGN PATENT DOCUMENTS

| | | |
|---|---|---|
| WO | WO 00/41383 | 7/2000 |
| WO | WO 00/54488 | 9/2000 |
| WO | PCT/US03/13818 | 4/2003 |

OTHER PUBLICATIONS

Shoemake, Matthew B. "MultiBand OFDM Update and Overview" WiQuest Communications, Inc., MBOA, 21Slides, Jan. 24, 2005.

"Ultrawideband: High-speed, short-range technology with far-reaching effects" MBOA-SIG White Paper, Sep. 1, 2004, 17 pages.

Batra, Anuj et al., "Multiband OFDM: Why it Wins for UWB" CommsDesign http://www.commsdesion.com/printableArticle/; jessionid=QDGDITH... Jun. 24, 2003, 7 pages.

"MultiBand OFDM Physical Layer Proposal for IEEE 802.15 Task Group 3a" MBOA-SIG, Sep. 14, 2004 info@ multibandofdm.org.

Search Report for co-pending PCT/US2007/083359 listing relevant art cited by the International Searching Authority.

Foerster J., et al., "Ultra-Wideband Technology for Short- or Medium-Range Wireless Communication", Intel Technology J. Q2, pp. 36-40, 61-66 (2001).

Leemans, W.P., et al., "Plasma Guiding and Wakefield Generation for Second-Generation Experiments", IEEE Transactions on Plasma Science, vol. 24, No. 2, pp. 331-341, Apr. 1996.

Supplementary Partial European Search Report, EP 03724414, dated Jul. 26, 2011.

* cited by examiner

MegaBand Tx-Side Processor Steps

MegaBand Rx-Side
Processor Steps

MegaBand

CATV Plant
UWB Multi-Band Calculations

| 550Mhz CATV Plant Parameter | Value | Unit |
|---|---|---|
| Band 1 | | |
| Upper Frequency | 162,843,750 | Hz |
| Lower Frequency | 50,000,000 | Hz |
| Center Frequency | 144,750,000 | Hz |
| Pulse Size | 6.9085 | ns |
| Max Mpps | 14.7085 | ns |
| Guard Space | 0.2915 | ns |
| Total Mpps | 15.0000 | ns |
| Bandwidth | 66,666,667 | bps |
| VP Encoded | 533,333,333 | bps |
| Band 2 | | |
| Upper Frequency | 436,500,000 | Hz |
| Lower Frequency | 339,500,000 | Hz |
| Center Frequency | 388,000,000 | Hz |
| Pulse Size | 2.5773 | ns |
| Max Mpps | 10.3773 | ns |
| Guard Space | 0.6227 | ns |
| Total Mpps | 11.0000 | ns |
| Bandwidth | 90,909,091 | bps |
| VP Encoded | 727,272,727 | bps |
| Band 3 | | |
| Upper Frequency | 562,500,000 | Hz |
| Lower Frequency | 437,500,000 | Hz |
| Center Frequency | 500,000,000 | Hz |
| Pulse Size | 2.0000000000 | ns |
| Max Mpps | 9.8000 | ns |
| Guard Space | 0.2000 | ns |
| Total Mpps | 10.00000 | ns |
| Bandwidth | 100,000,000 | bps |
| VP Encoded | 800,000,000 | bps |
| Total Bandwidth | 257,575,758 | bps |
| Total VP Encoded | 2,060,606,061 | bps |

| 750Mhz CATV Plant Parameter | Value | Unit |
|---|---|---|
| Band 1 | | |
| Upper Frequency | 575,000,000 | Hz |
| Lower Frequency | 50,000,000 | Hz |
| Center Frequency | 175,000,000 | Hz |
| Pulse Size | 5.7143 | ns |
| Max Mpps | 13.5143 | ns |
| Guard Space | 0.4857 | ns |
| Total Mpps | 14.0000 | ns |
| Bandwidth | 71,428,571 | bps |
| VP Encoded | 571,428,571 | bps |
| Band 2 | | |
| Upper Frequency | 575,000,000 | Hz |
| Lower Frequency | 300,000,000 | Hz |
| Center Frequency | 437,500,000 | Hz |
| Pulse Size | 2.2857 | ns |
| Max Mpps | 10.0857 | ns |
| Guard Space | 0.9143 | ns |
| Total Mpps | 11.0000 | ns |
| Bandwidth | 90,909,091 | bps |
| VP Encoded | 727,272,727 | bps |
| Band 3 | | |
| Upper Frequency | 800,000,000 | Hz |
| Lower Frequency | 575,000,000 | Hz |
| Center Frequency | 687,500,000 | Hz |
| Pulse Size | 1.4545454545 | ns |
| Max Mpps | 9.2545 | ns |
| Guard Space | 0.7455 | ns |
| Total Mpps | 10.00000 | ns |
| Bandwidth | 100,000,000 | bps |
| VP Encoded | 800,000,000 | bps |
| Total Bandwidth | 262,337,662 | bps |
| Total VP Encoded | 2,098,701,299 | bps |

| 1Ghz CATV Plant Parameter | Value | Unit |
|---|---|---|
| Band 1 | | |
| Upper Frequency | 575,000,000 | Hz |
| Lower Frequency | 50,000,000 | Hz |
| Center Frequency | 175,000,000 | Hz |
| Pulse Size | 5.7143 | ns |
| Max Mpps | 13.5143 | ns |
| Guard Space | 0.4857 | ns |
| Total Mpps | 14.0000 | ns |
| Bandwidth | 71,428,571 | bps |
| VP Encoded | 571,428,571 | bps |
| Band 2 | | |
| Upper Frequency | 575,000,000 | Hz |
| Lower Frequency | 300,000,000 | Hz |
| Center Frequency | 437,500,000 | Hz |
| Pulse Size | 2.2857 | ns |
| Max Mpps | 10.0857 | ns |
| Guard Space | 0.9143 | ns |
| Total Mpps | 11.0000 | ns |
| Bandwidth | 90,909,091 | bps |
| VP Encoded | 727,272,727 | bps |
| Band 3 | | |
| Upper Frequency | 800,000,000 | Hz |
| Lower Frequency | 575,000,000 | Hz |
| Center Frequency | 687,500,000 | Hz |
| Pulse Size | 1.4545454545 | ns |
| Max Mpps | 9.2545 | ns |
| Guard Space | 0.7455 | ns |
| Total Mpps | 10.00000 | ns |
| Bandwidth | 100,000,000 | bps |
| VP Encoded | 800,000,000 | bps |
| Band 4 | | |
| Upper Frequency | 1,000,000,000 | Hz |
| Lower Frequency | 800,000,000 | Hz |
| Center Frequency | 900,000,000 | Hz |
| Total Bandwidth | 362,337,662 | bps |
| Total VP Encoded | 2,898,701,299 | bps |

Fig. 6

CATV Plant
UWB Maximum Multi-Band Calculations

| 550Mhz CATV Plant Parameter | Value | Unit |
|---|---|---|
| Total Bandwidth | 492,657,343 | bps |
| Total VP Encoded | 3,941,258,741 | bps |
| Band 1 | | |
| Upper Frequency | 64,285,714 | Hz |
| Lower Frequency | 50,000,000 | Hz |
| Center Frequency | 57,142,857 | Hz |
| Pulse Size | 17.5000 | ns |
| Max Mpps | 25.3000 | ns |
| Guard Space | 0.7000 | ns |
| Total Mpps | 26.0000 | ns |
| Bandwidth | 38,461,538 | bps |
| VP Encoded | 307,692,308 | bps |
| Band 2 | | |
| Upper Frequency | 82,653,061 | Hz |
| Lower Frequency | 64,285,714 | Hz |
| Center Frequency | 73,469,388 | Hz |
| Pulse Size | 13.6111 | ns |
| Max Mpps | 21.4111 | ns |
| Guard Space | 0.5889 | ns |
| Total Mpps | 22.0000 | ns |
| Bandwidth | 45,454,545 | bps |
| VP Encoded | 363,636,364 | bps |

Fig.7A

CATV Plant
UWB Maximum Multi-Band Calculations

| 550Mhz CATV Plant Parameter | Value | Unit |
|---|---|---|
| Total Bandwidth | 492,657,343 | bps |
| Total VP Encoded | 3,941,258,741 | bps |
| Band 3 | | |
| Upper Frequency | 106,268,222 | Hz |
| Lower Frequency | 82,653,061 | Hz |
| Center Frequency | 94,460,641 | Hz |
| Pulse Size | 10.5864197531 | ns |
| Max Mpps | 18.3864 | ns |
| Guard Space | 0.6136 | ns |
| Total Mpps | 19.00000 | ns |
| Bandwidth | 52,631,579 | bps |
| VP Encoded | 421,052,632 | bps |
| Band 4 | | |
| Upper Frequency | 136,630,571 | Hz |
| Lower Frequency | 106,268,222 | Hz |
| Center Frequency | 121,449,396 | Hz |
| Pulse Size | 8.2338820302 | ns |
| Max Mpps | 16.0339 | ns |
| Guard Space | 0.9661 | ns |
| Total Mpps | 17.00000 | ns |
| Bandwidth | 58,823,529 | bps |
| VP Encoded | 470,588,235 | bps |

CATV Plant
UWB Maximum Multi-Band Calculations

| 550Mhz CATV Plant Parameter | Value | Unit |
|---|---|---|
| Total Bandwidth | 492,657,343 | bps |
| Total VP Encoded | 3,941,258,741 | bps |
| Band 5 | | |
| Upper Frequency | 175,667,876 | Hz |
| Lower Frequency | 136,630,571 | Hz |
| Center Frequency | 156,149,224 | Hz |
| Pulse Size | 6.4041304679 | ns |
| Max Mpps | 14.2041 | ns |
| Guard Space | 0.7959 | ns |
| Total Mpps | 15.00000 | ns |
| Bandwidth | 66,666,667 | bps |
| VP Encoded | 533,333,333 | bps |
| Band 6 | | |
| Upper Frequency | 225,858,698 | Hz |
| Lower Frequency | 175,667,876 | Hz |
| Center Frequency | 200,763,287 | Hz |
| Pulse Size | 4.9809903639 | ns |
| Max Mpps | 12.7810 | ns |
| Guard Space | 0.2190 | ns |
| Total Mpps | 13.00000 | ns |
| Bandwidth | 76,923,077 | bps |
| VP Encoded | 615,384,615 | bps |

Fig. 7D

CATV Plant
UWB Maximum Multi-Band Calculations

| 550Mhz CATV Plant Parameter | Value | Unit |
|---|---|---|
| Total Bandwidth | 492,657,343 | bps |
| Total VP Encoded | 3,941,258,741 | bps |
| Band 7 | | |
| Upper Frequency | 290,389,755 | Hz |
| Lower Frequency | 225,858,698 | Hz |
| Center Frequency | 258,124,227 | Hz |
| Pulse Size | 3.8741036164 | ns |
| Max Mpps | 11.6741 | ns |
| Guard Space | 0.3259 | ns |
| Total Mpps | 12.00000 | ns |
| Bandwidth | 83,333,333 | bps |
| VP Encoded | 666,666,667 | bps |
| Band 8 | | |
| Upper Frequency | 373,358,256 | Hz |
| Lower Frequency | 290,389,755 | Hz |
| Center Frequency | 331,874,006 | Hz |
| Pulse Size | 3.0131917016 | ns |
| Max Mpps | 10.8132 | ns |
| Guard Space | 0.1868 | ns |
| Total Mpps | 11.00000 | ns |
| Bandwidth | 90,909,091 | bps |
| VP Encoded | 727,272,727 | bps |

CATV Plant
UWB Maximum Multi-Band Calculations

| 550Mhz CATV Plant | | |
|---|---|---|
| Parameter | Value | Unit |
| Total Bandwidth | 492,657,343 | bps |
| Total VP Encoded | 3,941,258,741 | bps |

Band 9

| | | |
|---|---|---|
| Upper Frequency | 480,032,044 | Hz |
| Lower Frequency | 373,358,256 | Hz |
| Center Frequency | 426,695,150 | Hz |
| Pulse Size | 2.3435935457 | ns |
| Max Mpps | 10.1436 | ns |
| Guard Space | 0.8564 | ns |
| Total Mpps | 11.00000 | ns |
| Bandwidth | 90,909,091 | bps |
| VP Encoded | 727,272,727 | bps |

Fig. 7E

CATV Plant
UWB Maximum Multi-Band Calculations

| 750Mhz CATV Plant Parameter | Value | Unit |
|---|---|---|
| Total Bandwidth | 692,657,343 | bps |
| Total VP Encoded | 5,541,258,741 | bps |
| Band 3 | | |
| Upper Frequency | 106,268,222 | Hz |
| Lower Frequency | 82,653,061 | Hz |
| Center Frequency | 94,460,641 | Hz |
| Pulse Size | 10.5864197531 | ns |
| Max Mpps | 18.3864 | ns |
| Guard Space | 0.6136 | ns |
| Total Mpps | 19.00000 | ns |
| Bandwidth | 52,631,579 | bps |
| VP Encoded | 421,052,632 | bps |
| Band 4 | | |
| Upper Frequency | 136,630,571 | Hz |
| Lower Frequency | 106,268,222 | Hz |
| Center Frequency | 121,449,396 | Hz |
| Pulse Size | 8.2338820302 | ns |
| Max Mpps | 16.0339 | ns |
| Guard Space | 0.9661 | ns |
| Total Mpps | 17.00000 | ns |
| Bandwidth | 58,823,529 | bps |
| VP Encoded | 470,588,235 | bps |

Fig.8B

CATV Plant
UWB Maximum Multi-Band Calculations

| 750Mhz CATV Plant Parameter | Value | Unit |
|---|---|---|
| Total Bandwidth | 692,657,343 | bps |
| Total VP Encoded | 5,541,258,741 | bps |
| Band 1 | | |
| Upper Frequency | 64,285,714 | Hz |
| Lower Frequency | 50,000,000 | Hz |
| Center Frequency | 57,142,857 | Hz |
| Pulse Size | 17.5000 | ns |
| Max Mpps | 25.3000 | ns |
| Guard Space | 0.7000 | ns |
| Total Mpps | 26.0000 | ns |
| Bandwidth | 38,461,538 | bps |
| VP Encoded | 307,692,308 | bps |
| Band 2 | | |
| Upper Frequency | 82,653,061 | Hz |
| Lower Frequency | 64,285,714 | Hz |
| Center Frequency | 73,469,388 | Hz |
| Pulse Size | 13.6111 | ns |
| Max Mpps | 21.4111 | ns |
| Guard Space | 0.5889 | ns |
| Total Mpps | 22.0000 | ns |
| Bandwidth | 45,454,545 | bps |
| VP Encoded | 363,636,364 | bps |

Fig.8A

CATV Plant
UWB Maximum Multi-Band Calculations

| 750Mhz CATV Plant Parameter | Value | Unit |
|---|---|---|
| Total Bandwidth | 692,657,343 | bps |
| Total VP Encoded | 5,541,258,741 | bps |
| Band 5 | | |
| Upper Frequency | 175,667,876 | Hz |
| Lower Frequency | 136,630,571 | Hz |
| Center Frequency | 156,149,224 | Hz |
| Pulse Size | 6.4041304679 | ns |
| Max Mpps | 14.2041 | ns |
| Guard Space | 0.7959 | ns |
| Total Mpps | 15.00000 | ns |
| Bandwidth | 66,666,667 | bps |
| VP Encoded | 533,333,333 | bps |
| Band 6 | | |
| Upper Frequency | 225,858,698 | Hz |
| Lower Frequency | 175,667,876 | Hz |
| Center Frequency | 200,763,287 | Hz |
| Pulse Size | 4.9809903639 | ns |
| Max Mpps | 12.7810 | ns |
| Guard Space | 0.2190 | ns |
| Total Mpps | 13.00000 | ns |
| Bandwidth | 76,923,077 | bps |
| VP Encoded | 615,384,615 | bps |

Fig.8C

CATV Plant
UWB Maximum Multi-Band Calculations

| 750Mhz CATV Plant Parameter | Value | Unit |
|---|---|---|
| Total Bandwidth | 692,657,343 | bps |
| Total VP Encoded | 5,541,258,741 | bps |
| Band 7 | | |
| Upper Frequency | 290,389,755 | Hz |
| Lower Frequency | 225,858,698 | Hz |
| Center Frequency | 258,124,227 | Hz |
| Pulse Size | 3.8741036164 | ns |
| Max Mpps | 11.6741 | ns |
| Guard Space | 0.3259 | ns |
| Total Mpps | 12.00000 | ns |
| Bandwidth | 83,333,333 | bps |
| VP Encoded | 666,666,667 | bps |
| Band 8 | | |
| Upper Frequency | 373,358,256 | Hz |
| Lower Frequency | 290,389,755 | Hz |
| Center Frequency | 331,874,006 | Hz |
| Pulse Size | 3.0131917016 | ns |
| Max Mpps | 10.8132 | ns |
| Guard Space | 0.1868 | ns |
| Total Mpps | 11.00000 | ns |
| Bandwidth | 90,909,091 | bps |
| VP Encoded | 727,272,727 | bps |

Fig.8D

CATV Plant
UWB Maximum Multi-Band Calculations

| 750Mhz CATV Plant Parameter | Value | Unit |
|---|---|---|
| Total Bandwidth | 692,657,343 | bps |
| Total VP Encoded | 5,541,258,741 | bps |
| Band 9 | | |
| Upper Frequency | 480,032,044 | Hz |
| Lower Frequency | 373,358,256 | Hz |
| Center Frequency | 426,695,150 | Hz |
| Pulse Size | 2.3435935457 | ns |
| Max Mpps | 10.1436 | ns |
| Guard Space | 0.8564 | ns |
| Total Mpps | 11.00000 | ns |
| Bandwidth | 90,909,091 | bps |
| VP Encoded | 727,272,727 | bps |
| Band 10 | | |
| Upper Frequency | 617,184,057 | Hz |
| Lower Frequency | 480,032,044 | Hz |
| Center Frequency | 548,608,050 | Hz |
| Pulse Size | 1.8227949800 | ns |
| Max Mpps | 9.6228 | ns |
| Guard Space | 0.3772 | ns |
| Total Mpps | 10.00000 | ns |
| Bandwidth | 100,000,000 | bps |
| VP Encoded | 800,000,000 | bps |

Fig.8E

CATV Plant
UWB Maximum Multi-Band Calculations

| 750Mhz CATV Plant Parameter | Value | Unit |
|---|---|---|
| Total Bandwidth | 692,657,343 | bps |
| Total VP Encoded | 5,541,258,741 | bps |
| Band 11 | | |
| Upper Frequency | 793,522,358 | Hz |
| Lower Frequency | 617,184,057 | Hz |
| Center Frequency | 705,353,207 | Hz |
| Pulse Size | 1.4177294289 | ns |
| Max Mpps | 9.2177 | ns |
| Guard Space | 0.7823 | ns |
| Total Mpps | 10.00000 | ns |
| Bandwidth | 100,000,000 | bps |
| VP Encoded | 800,000,000 | bps |

Fig.8F

CATV Plant
UWB Maximum Multi-Band Calculations

| 1Ghz CATV Plant Parameter | Value | Unit |
|---|---|---|
| Total Bandwidth | 792,657,343 | bps |
| Total VP Encoded | 6,341,258,741 | bps |

Band 3

| | | |
|---|---|---|
| Upper Frequency | 106,268,222 | Hz |
| Lower Frequency | 82,653,061 | Hz |
| Center Frequency | 94,460,641 | Hz |
| Pulse Size | 10.5864197531 | ns |
| Max Mpps | 18.3864 | ns |
| Guard Space | 0.6136 | ns |
| Total Mpps | 19.00000 | ns |
| Bandwidth | 52,631,579 | bps |
| VP Encoded | 421,052,632 | bps |

Band 4

| | | |
|---|---|---|
| Upper Frequency | 136,630,571 | Hz |
| Lower Frequency | 106,268,222 | Hz |
| Center Frequency | 121,449,396 | Hz |
| Pulse Size | 8.2338820302 | ns |
| Max Mpps | 16.0339 | ns |
| Guard Space | 0.9661 | ns |
| Total Mpps | 17.00000 | ns |
| Bandwidth | 58,823,529 | bps |
| VP Encoded | 470,588,235 | bps |

Fig.9B

CATV Plant
UWB Maximum Multi-Band Calculations

| 1Ghz CATV Plant Parameter | Value | Unit |
|---|---|---|
| Total Bandwidth | 792,657,343 | bps |
| Total VP Encoded | 6,341,258,741 | bps |

Band 1

| | | |
|---|---|---|
| Upper Frequency | 64,285,714 | Hz |
| Lower Frequency | 50,000,000 | Hz |
| Center Frequency | 57,142,857 | Hz |
| Pulse Size | 17.5000 | ns |
| Max Mpps | 25.3000 | ns |
| Guard Space | 0.7000 | ns |
| Total Mpps | 26.0000 | ns |
| Bandwidth | 38,461,538 | bps |
| VP Encoded | 307,692,308 | bps |

Band 2

| | | |
|---|---|---|
| Upper Frequency | 82,653,061 | Hz |
| Lower Frequency | 64,285,714 | Hz |
| Center Frequency | 73,469,388 | Hz |
| Pulse Size | 13.6111 | ns |
| Max Mpps | 21.4111 | ns |
| Guard Space | 0.5889 | ns |
| Total Mpps | 22.0000 | ns |
| Bandwidth | 45,454,545 | bps |
| VP Encoded | 363,636,364 | bps |

Fig.9A

CATV Plant
UWB Maximum Multi-Band Calculations

| 1Ghz CATV Plant Parameter | Value | Unit |
|---|---|---|
| Total Bandwidth | 792,657,343 | bps |
| Total VP Encoded | 6,341,258,741 | bps |

Band 5

| Parameter | Value | Unit |
|---|---|---|
| Upper Frequency | 175,667,876 | Hz |
| Lower Frequency | 136,630,571 | Hz |
| Center Frequency | 156,149,224 | Hz |
| Pulse Size | 6.4041304679 | ns |
| Max Mpps | 14.2041 | ns |
| Guard Space | 0.7959 | ns |
| Total Mpps | 15.00000 | ns |
| Bandwidth | 66,666,667 | bps |
| VP Encoded | 533,333,333 | bps |

Band 6

| Parameter | Value | Unit |
|---|---|---|
| Upper Frequency | 225,858,698 | Hz |
| Lower Frequency | 175,667,876 | Hz |
| Center Frequency | 200,763,287 | Hz |
| Pulse Size | 4.9809903639 | ns |
| Max Mpps | 12.7810 | ns |
| Guard Space | 0.2190 | ns |
| Total Mpps | 13.00000 | ns |
| Bandwidth | 76,923,077 | bps |
| VP Encoded | 615,384,615 | bps |

Fig.9C

CATV Plant
UWB Maximum Multi-Band Calculations

| 1Ghz CATV Plant Parameter | Value | Unit |
|---|---|---|
| Total Bandwidth | 792,657,343 | bps |
| Total VP Encoded | 6,341,258,741 | bps |

Band 7

| Parameter | Value | Unit |
|---|---|---|
| Upper Frequency | 290,389,755 | Hz |
| Lower Frequency | 225,858,698 | Hz |
| Center Frequency | 258,124,227 | Hz |
| Pulse Size | 3.8741036164 | ns |
| Max Mpps | 11.6741 | ns |
| Guard Space | 0.3259 | ns |
| Total Mpps | 12.00000 | ns |
| Bandwidth | 83,333,333 | bps |
| VP Encoded | 666,666,667 | bps |

Band 8

| Parameter | Value | Unit |
|---|---|---|
| Upper Frequency | 373,358,256 | Hz |
| Lower Frequency | 290,389,755 | Hz |
| Center Frequency | 331,874,006 | Hz |
| Pulse Size | 3.0131917016 | ns |
| Max Mpps | 10.8132 | ns |
| Guard Space | 0.1868 | ns |
| Total Mpps | 11.00000 | ns |
| Bandwidth | 90,909,091 | bps |
| VP Encoded | 727,272,727 | bps |

Fig.9D

CATV Plant
UWB Maximum Multi-Band Calculations

| 1Ghz CATV Plant Parameter | Value | Unit |
|---|---|---|
| Total Bandwidth | 792,657,343 | bps |
| Total VP Encoded | 6,341,258,741 | bps |
| Band 9 | | |
| Upper Frequency | 480,032,044 | Hz |
| Lower Frequency | 373,358,256 | Hz |
| Center Frequency | 426,695,150 | Hz |
| Pulse Size | 2.3435935457 | ns |
| Max Mpps | 10.1436 | ns |
| Guard Space | 0.8564 | ns |
| Total Mpps | 11.00000 | ns |
| Bandwidth | 90,909,091 | bps |
| VP Encoded | 727,272,727 | bps |
| Band 10 | | |
| Upper Frequency | 617,184,057 | Hz |
| Lower Frequency | 480,032,044 | Hz |
| Center Frequency | 548,608,050 | Hz |
| Pulse Size | 1.8227949800 | ns |
| Max Mpps | 9.6228 | ns |
| Guard Space | 0.3772 | ns |
| Total Mpps | 10.00000 | ns |
| Bandwidth | 100,000,000 | bps |
| VP Encoded | 800,000,000 | bps |

Fig.9E

CATV Plant
UWB Maximum Multi-Band Calculations

| 1Ghz CATV Plant Parameter | Value | Unit |
|---|---|---|
| Total Bandwidth | 792,657,343 | bps |
| Total VP Encoded | 6,341,258,741 | bps |
| Band 11 | | |
| Upper Frequency | 793,522,358 | Hz |
| Lower Frequency | 617,184,057 | Hz |
| Center Frequency | 705,353,207 | Hz |
| Pulse Size | 1.4177294289 | ns |
| Max Mpps | 9.2177 | ns |
| Guard Space | 0.7823 | ns |
| Total Mpps | 10.00000 | ns |
| Bandwidth | 100,000,000 | bps |
| VP Encoded | 800,000,000 | bps |
| Band 12 | | |
| Upper Frequency | 1,020,243,032 | Hz |
| Lower Frequency | 793,522,358 | Hz |
| Center Frequency | 906,882,695 | Hz |
| Pulse Size | 1.1026784447 | ns |
| Max Mpps | 8.9027 | ns |
| Guard Space | 1.0973 | ns |
| Total Mpps | 10.00000 | ns |
| Bandwidth | 100,000,000 | bps |
| VP Encoded | 800,000,000 | bps |

Fig.9F

METHOD AND APPARATUS FOR MULTI-BAND UWB COMMUNICATIONS

CROSS-REFERENCE TO RELATED APPLICATIONS

This application is a continuation-in-part of and claims priority U.S. patent application Ser. No. 10/427,039 entitled HIGH BANDWIDTH DATA TRANSPORT SYSTEM, filed on Apr. 30, 2003, which is a conversion of U.S. Provisional Patent Application, Ser. No. 60/376,592 entitled HIGH NUMBER BASED ENCODED ULTRA WIDEBAND OVER GUIDED AND NON-GUIDED NARROW BAND RADIO filed on Apr. 30, 2002 and Ser. No. 60/441,348, entitled HIGHBANDWIDTH DATA TRANSPORT SYSTEM, filed on Jan. 20, 2003, all of which are hereby incorporated by reference in their entirety. This application is also a continuation-in-part of and claims priority to U.S. patent application Ser. No. 10/967,850, entitled IMPROVED HIGH BANDWIDTH DATA TRANSPORT SYSTEM, filed on Oct. 18, 2004, which is a conversion of U.S. Patent Application Ser. No. 60/512,367, entitled ALTERNATING COUNTER PULSE HIGH BANDWIDTH DATA TRANSPORT SYSTEM, filed on Oct. 17, 2003 both of which are also hereby incorporated by reference in its entirety.

BACKGROUND OF THE INVENTION

The present invention relates to communications, and more specifically to ultra wideband (UWB) communications. UWB is defined generally to include ultra-low power radio signals sent in pulses across a frequency spectrum. Despite generally well-recognized advantages of UWB communications, problems exist.

The present invention addresses problems associated with UWB communications as well as a number of problems generally associated with communications, that may to some extent seem unrelated without having the benefit of this disclosure.

One problem frequently encountered in modern day communication systems is the problem of how to increase bandwidth. This well-known problem is prevalent in wired as well as wireless communications. This problem is particularly important with respect to the so-called "last mile." The last mile generally being known as the communications link that carries signals from the broadband communication system along the very short distance to and from a home or business. A related problem is the interfacing of a communication system to provide this last mile access to the broadband communication system.

Another problem relates to the ability to provide multiple access. It is generally desirable to be able to allow multiple users, multiple devices, or combinations of multiple users and multiple devices to share the same channel without interface. Yet implementation of such a system raises a number of problems and is not practical if total bandwidth is insufficient to support multiple access. Therefore, despite advances in communication systems, problems remain.

BRIEF SUMMARY OF THE INVENTION

Therefore, it is a general object, feature, or advantage of the present invention to improve over the state of the art.

Another object, feature, or advantage of the present invention is to provide for increasing the bandwidth of UWB transmissions over wireless and hard-wired mediums.

Yet another object, feature, or advantage of the present invention is to provide a UWB system that is adapted for multiple access, supporting multiple users, multiple devices, or combinations of multiple users and multiple devices.

A further object, feature, or advantage of the present invention is to provide for a multi-band UWB communication system.

A still further object, feature, or advantage of the present invention is to provide for interfacing between a first UWB communication system and a second communication system which may also be a UWB communication system.

One or more of these and/or other objects, object, feature, or advantages of the present invention will become apparent from the specification and claims that follow.

The present invention relates to methods and devices for sending and receiving UWB transmissions. According to one aspect of the invention, a UWB transmission is divided into multi-bands. The present invention allows each of these bands to be separately modulated, encoded, and/or multiplexed. Thus, the present invention can provide for improved bandwidth. The present invention also provides for interfacing to or between different types of UWB devices and different types of UWB transmissions. According to another aspect of the invention, a method for transmitting information over a first medium includes allocating for signal transmission, each of a plurality of frequency sub-bands of an ultra-wide band spectrum. An ultra-wide band transmission containing the information is then sent over the first medium. The ultra-wide band transmission is performed by sending a signal over each of the plurality of frequency sub-bands. The present invention provides for the first medium to be of any number of types of mediums, including both guided mediums such as electrically conductive mediums as well as non-guided mediums such as, air. There may be any number of frequency sub-bands. The information which is transmitted may be obtained from another signal transmission received over a second medium. The second medium may be of any number of types of mediums. The ultra-wide band signals may be encoded, modulated, and/or multiplexed in any number of ways.

According to another aspect of the invention, a device for providing a first communication link over a first medium and a second communication link over a second medium is provided. The device includes a first transceiver adapted for communication of a first type of transmission over the first medium and a second transceiver adapted for communication of a second type of transmission over the second medium. There is an interface operatively connected to the first transceiver and the second transceiver and adapted for translating information between the first type of transmission and the second type of transmission. At least one of the first type of transmission and the second type of transmission is a UWB transmission. The first and second medium can each be of any number of types of guided or non-guided medium. The first and second types of transmission can be of any number of types of transmission, including multi-band transmissions. And the signal(s) in each of the transmission can use any number of types of multiplexing, encoding, and modulation. When a UWB signal is used it can be of constant or variable length symbols. Also, signals of various directions can be accommodated, including simplex, half duplex, and full duplex. Also when a multi-band UWB transmission is used, each sub-band may be placed on a separate subcarrier.

According to another aspect of the invention a device for providing multi-band ultra-wideband communications over a medium is provided. The device includes an ultra-wideband transmitter adapted for sending over the first medium an ultra-wideband communication comprised of a plurality of frequency sub-bands of an ultra-wideband spectrum and an intelligent control operatively connected to the ultra-wideband transmitter and adapted for preparing data for incorporation into the ultrawide band communication. The device may further include an ultra-wideband receiver operatively connected to the intelligent control and adapted for receiving over the first medium a second ultra-wideband communication comprised of a plurality of frequency sub-bands of an ultra-wideband spectrum. The ultra-wideband communication may include ultra-wideband pulses modulated on sub-carriers using a modulation technique. The ultra-wideband communication may use any number of multiplexing techniques including orthogonal frequency multiplexing.

BRIEF DESCRIPTION OF THE DRAWINGS

FIG. 6 provides tables for CATV UWB multi-band calculations according to one embodiment of the present invention using 3 or 4 bands.

FIGS. 7A-7E provide a table for 550 MHz CATV UWB multi-band calculations according to one embodiment of the present invention using 9 bands.

FIGS. 8A-8F provide a table for 750 MHz CATV UWB multi-band calculations according to one embodiment of the present invention using 11 bands.

FIGS. 9A-9F provide a table for 1 GHZ CATV UWB multi-band calculations according to one embodiment of the present invention using 12 bands.

DETAILED DESCRIPTION OF THE PREFERRED EMBODIMENT

The present invention provides for multi-band UWB communication, including multi-band UWB communication across guided media. The present invention also provides for interfacing UWB communications with other types of communications, including interfacing between two different types of UWB communications.

Figure 1:
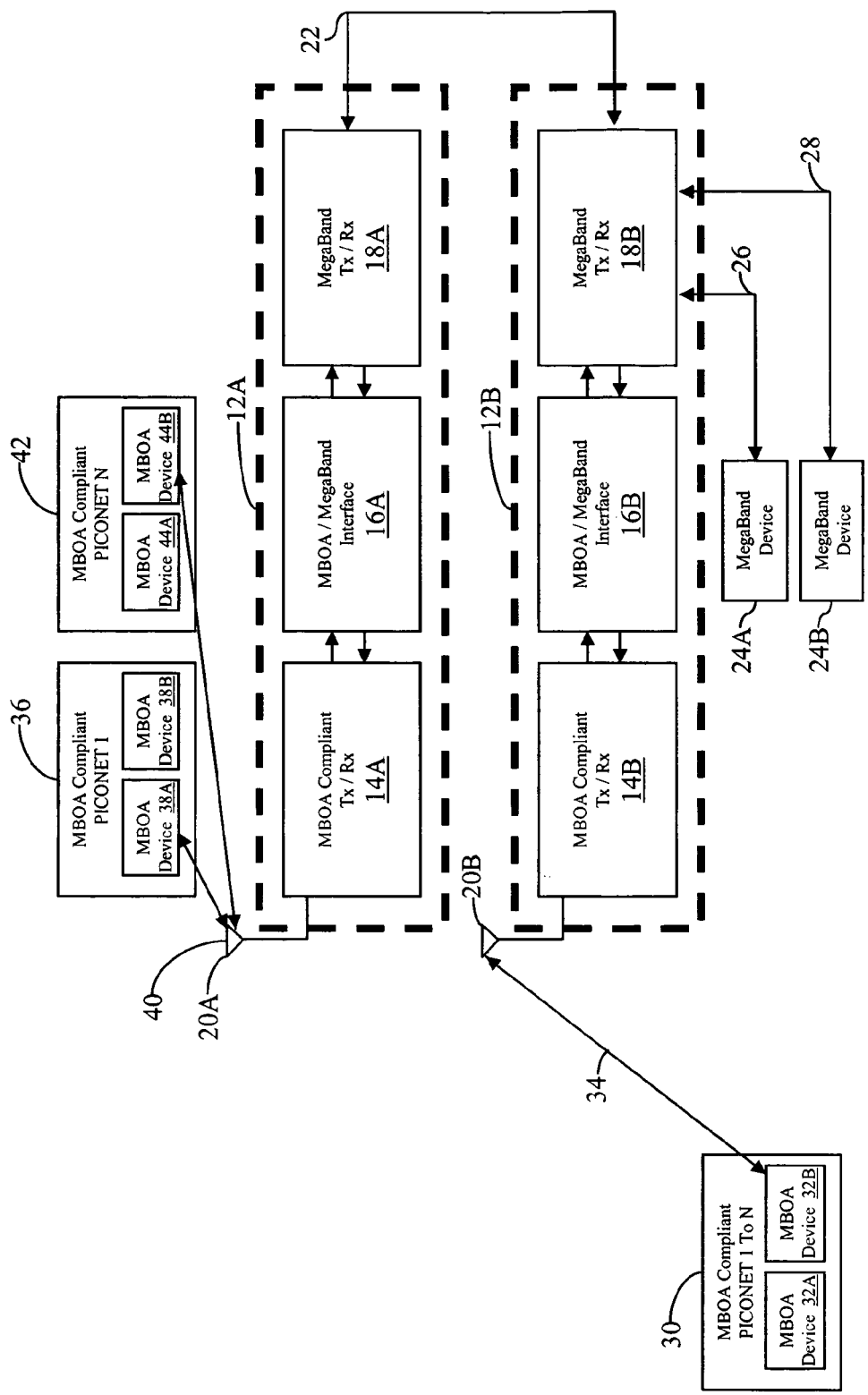
FIG. 1 a diagram illustrating one embodiment of a system of the present invention.

FIG. 1 illustrates one embodiment of a system of the present invention. In FIG. 1, a first device 12A and a second device 12B are shown. The first device 12A includes a transceiver 14A which is preferably MBOA Compliant, an interface 16A and a MegaBand transceiver 18A. The term MBOA refers to the MultiBand OFDM Alliance and its UWB standard(s). This standard is merely one example of a wireless multi-band technical specification that can be used according to the present invention. The term MegaBand refers to Lightwaves Systems, Inc. technology, such as that described in U.S. patent application Ser. No. 10/427,039 entitled HIGH BANDWIDTH DATA TRANSPORT SYSTEM, filed on Apr. 30, 2003. Generally, although there are exceptions, a MegaBand device is a device adapted for UWB communications over a wired or otherwise guided medium. The second device 12B also includes a transceiver 14B which is preferably MBOA compliant, an interface 16B, and a MegaBand transceiver 18B. There is an electrical connection 22 between the devices 12A, 12B.

The first device 12A and the second device 12B each have an antenna 20A, 20B for wireless communication. As shown in FIG. 1 an MBOA Compliant piconet 36 comprised of an MBOA device 38A and an MBOA device 38B is in operative communication with the MBOA compliant transceiver 14A. Similarly, the MBOA Compliant piconet 42 comprised of an MBOA device 44A and an MBOA device 44B is in operative communication with the MBOA compliant transceiver 14A. Also, as shown in FIG. 1, an MBOA Compliant piconet 30 comprised of MBOA devices 32A and 32B is in operative communication with the MBOA compliant transceiver 14B.

A first MegaBand device 24A is operatively connected over a wired medium 26 to the MegaBand transceiver 18B. Similarly a second MegaBand device 24B is operatively connected over a wired medium 28 to the MegaBand transceiver 18B. As shown in FIG. 1, one aspect of the present invention allows for interfacing communications of different specifications. In particular, as shown in FIG. 1, a wireless multiband UWB communications is interfaced with a wired UWB communications (which may also be multiband). It is recognized that differences in the type of mediums used can result in differences in the proper or advantageous specifications used for communications. For example, different types of encoding, different types of modulation, and different means for providing multiple access may be selected based in part by physical or regulatory limitations associated with a particular medium. The present invention provides for interfacing between transceivers of different communications schemes including interfacing between wired UWB communications and wireless UWB communications.

As shown in FIG. 1, there are multiple piconets (36,42) in communication with the transceiver 14A. The present invention allows multiple independent sets of networking devices to share the same channel without interference. This multiple accessing (multiple users, multiple devices, or combinations of both) or multiplexing can be performed in any number of ways, including through use of synchronous or asynchronous time division multiplexing (TDM), frequency division multiplexing (FDM), orthogonal frequency division multiplexing (OFDM), code division multiplexing (CDM) or time hopping (TH) schemes. The present invention is not, however, limited to these specific schemes.

Figure 2:
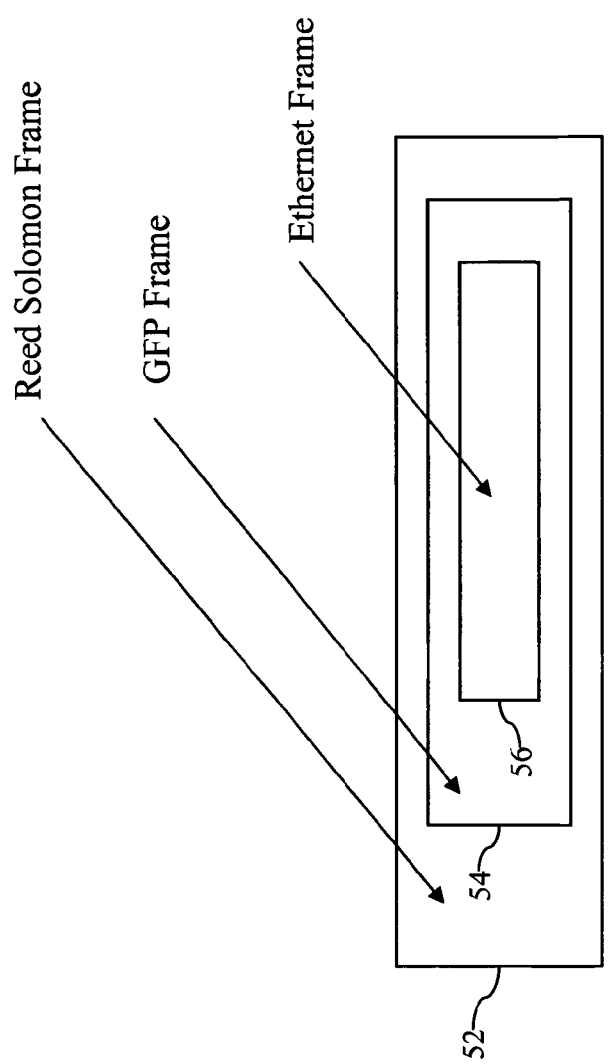
FIG. 2 is a diagram showing the relationship between different frames in accordance with one embodiment of the present invention.

In one embodiment of the present invention, the interfaces 16A, 16B of the present invention add a wrapper to received frames of data in order to repackage data from one communication system to another. FIG. 2 is a diagram showing the relationship between different frames in accordance with one embodiment of the present invention. In FIG. 2, an Ethernet frame 56 is packaged within a GFP frame 54 which in turn is packaged within a Reed Solomon frame 52. The Reed Solomon frame 52 contains data symbols as well as check symbols for error detection and correction. The GFP Frame 54 provides a common data-mapping scheme for SONET/SDH. GFP is generally defined in ITU standard G.7041.

Figure 3:
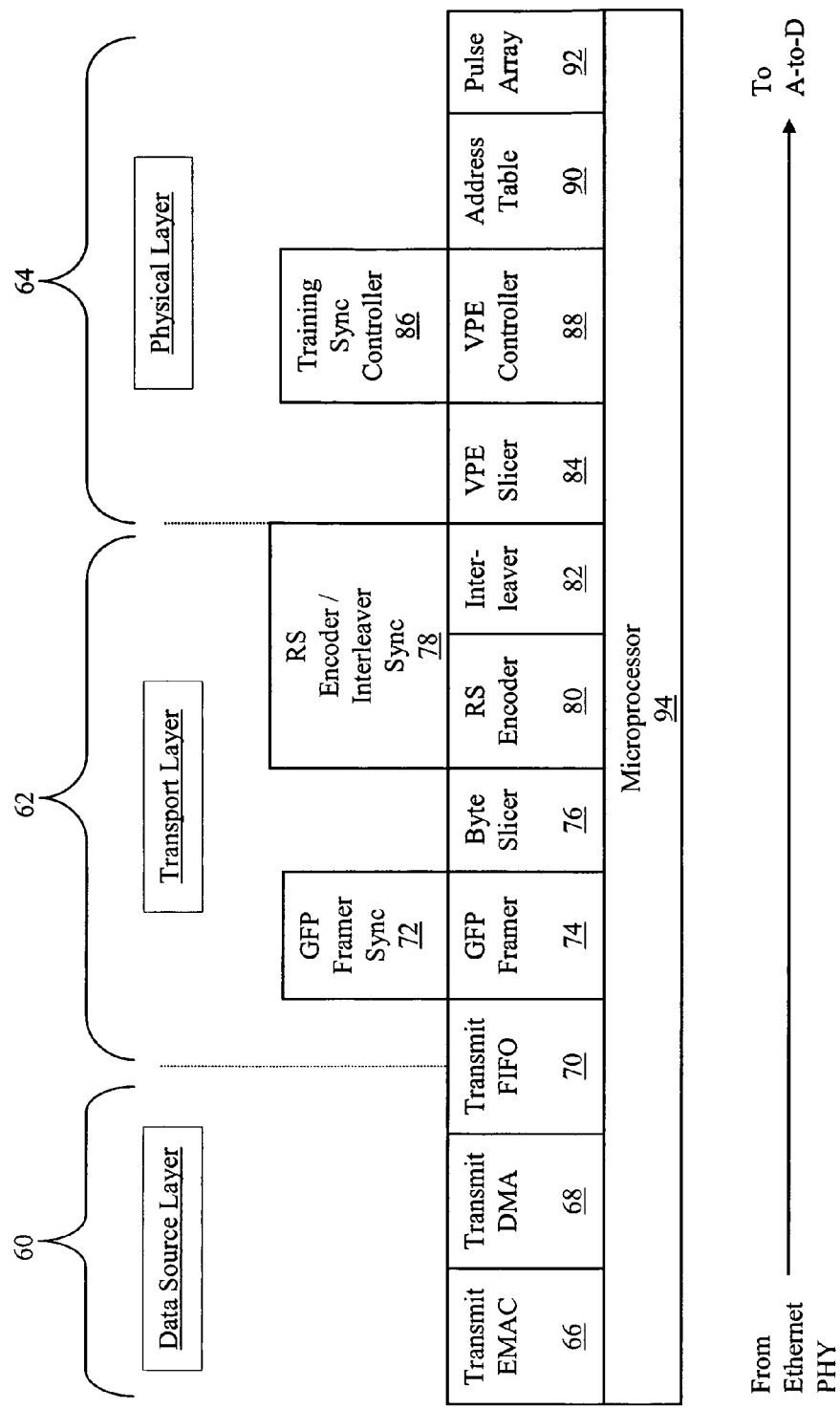
FIG. 3 is a diagram illustrating transmitter processing steps according to one embodiment of the present invention.

FIG. 3 is a diagram illustrating transmitter processing steps according to one embodiment of the present invention. In FIG. 3, a data source layer 60, transport layer 62, and physical layer 64 are shown. Ethernet data is processed to ultimately result in pulsed data.

Beginning with the data source layer 60, in step 66, Ethernet Media Access Control (EMAC) data is transmitted. In step 68, Director Memory Access (DMA) information is transmitted. In step 70, First-In-First-Out (FIFO) 70 data is transmitted thus beginning the transport layer 62. Next, the GFP Framer Sync step 72 and GFP Framer step 74 are applied. A Byte Slicer step 76 is next applied. Then RS Encoder/Interleaver Sync 78, RS Encoder 80, and Interleaver 82 steps are applied.

Next the physical layer 64 steps are applied. In a preferred embodiment, the present invention uses variable pulse encoding (VPE) described in U.S. Patent Publication No. 2002-0076193, and U.S. patent application Ser. No. 10/967,859, entitled SYSTEM AND METHOD OF USING VARIABLE PULSES FOR SYMBOLOGY, hereby incorporated by reference in its entirety. In step 84 a VPE slicer is applied. Then in steps 86 and 88 a training sync controller and a VPE controller are used. In step 90 an address table is used and in step 92 data is transmitted through a pulse array. Thus, FIG. 3 illustrates the process of incoming Ethernet data being transformed into pulses.

Figure 4:
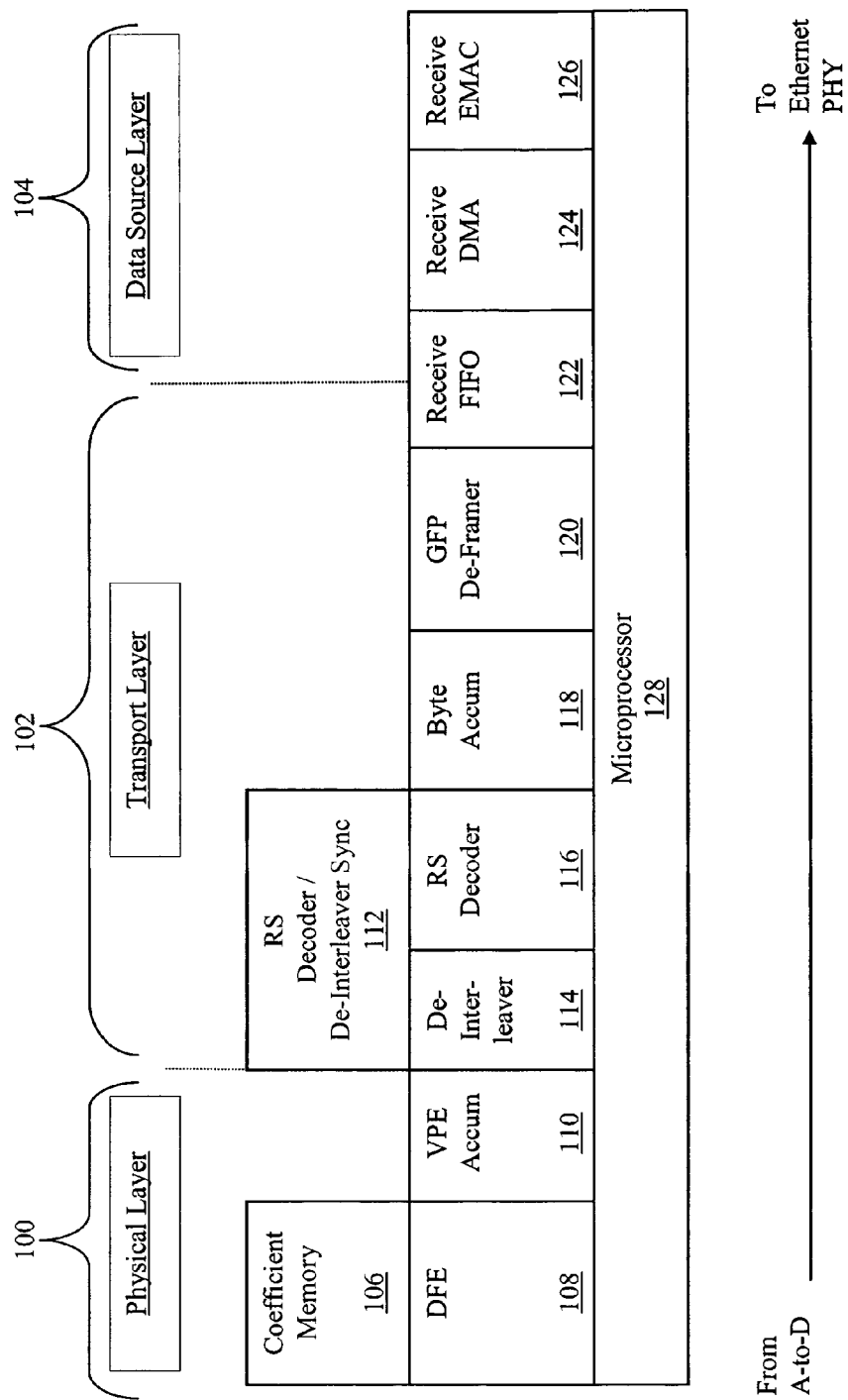
FIG. 4 is a diagram illustrating receiver processing steps according to one embodiment of the present invention.

FIG. 4 is a diagram illustrating receiver side processor steps according to one embodiment of the present invention. In FIG. 4, the physical layer 100, transport layer 102, and data source layer 104 are all shown. A coefficient memory 106 and decision feedback equalizer (DFE) steps 108 are shown. Then a VPE accumulator 110 step is shown. Next an RS Decoder/de-interleaver synchronization step 112 is shown including the de-interleaver step 114 and RS decoder step 116. A byte accumulator step 118 is shown. A GFP de-framer step 120 is shown. Then a receiver FIFO step 122 is shown as well as a receive DMA step 124 and a receiver EMAC step 126. Thus, FIG. 4 illustrates receiving from an analog-to-digital converter of a signal and processing to Ethernet.

Figure 5:
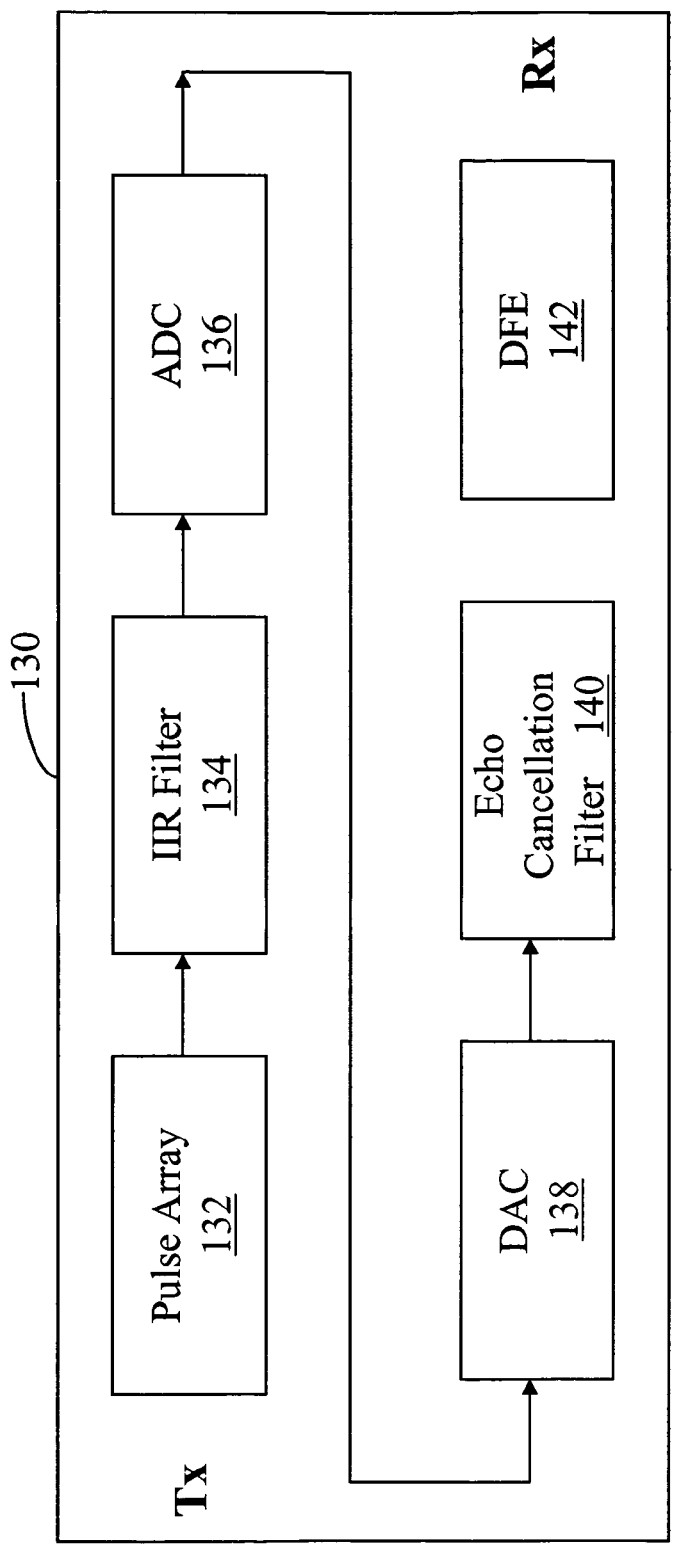
FIG. 5 is a diagram illustrating one embodiment of a transceiver of the present invention.

FIG. 5 illustrates one embodiment of a transceiver of the present invention. In FIG. 5, the transmitter portion of the transceiver 130 includes a pulse array 132 operatively connected to an IIR filter 134 which is operatively connected to an analog-to-digital converter 136. The receiver portion includes a digital-to-analog converter 138 which is operatively connected to an echo cancellation filter 140 which is operatively connected to a DFE 142.

The present invention also provides for multi-band UWB communications. FIG. 6 provides tables for CATV UWB multi-band calculations according to one embodiment of the present invention using 3 or 4 bands. As shown in FIG. 6, each band is preferably variable pulse encoded. The present invention, however, allows for any number of types of encoding schemes. Also, the present invention allows for different numbers of bands to be used. FIGS. 7A-7E provide tables for 550 MHz CATV UWB multi-band calculations according to one embodiment of the present invention using 9 bands. FIGS. 8A-8F provide tables for 750 MHz CATV UWB multi-band calculations according to one embodiment of the present invention using 11 bands. FIGS. 9A-9F provide tables for 1 GHZ CATV UWB multi-band calculations according to one embodiment of the present invention using 12 bands. Thus, it should be apparent that the present invention provides for using UWB with multi-bands and also provides for optionally encoding each band in any number of ways, including through variable pulse encoding. It should also be apparent, that the present invention allows for multi-band UWB transmission over any number of mediums, including, but not limited to CATV. Non-exhaustive examples of other types of mediums include un-bonded telephone twisted pair, bonded telephone twisted pair, coaxial cable, power lines, shielded pair wire, metallic vehicle bodies, structural steel, railroad rail, reinforcing bar, metallic water pipes, metallic pipeline transport, metal desks, computer backplanes, drill stem, the human body, conductive mediums, guided mediums, non-guided mediums, air, and any number of other transmission mediums or combinations of transmission mediums.

As should be clear from FIGS. 7A-7E, 8A-8F, and 9A-9F, the present invention provides for the use of more than a sub-carrier to transmit data using ultra wideband pulses. Also, the present invention provides for the grouping of multiple sub-carriers to transmit data into one or more frequency band groups. Thus, the present invention allows for multiple access.

Figure 10:
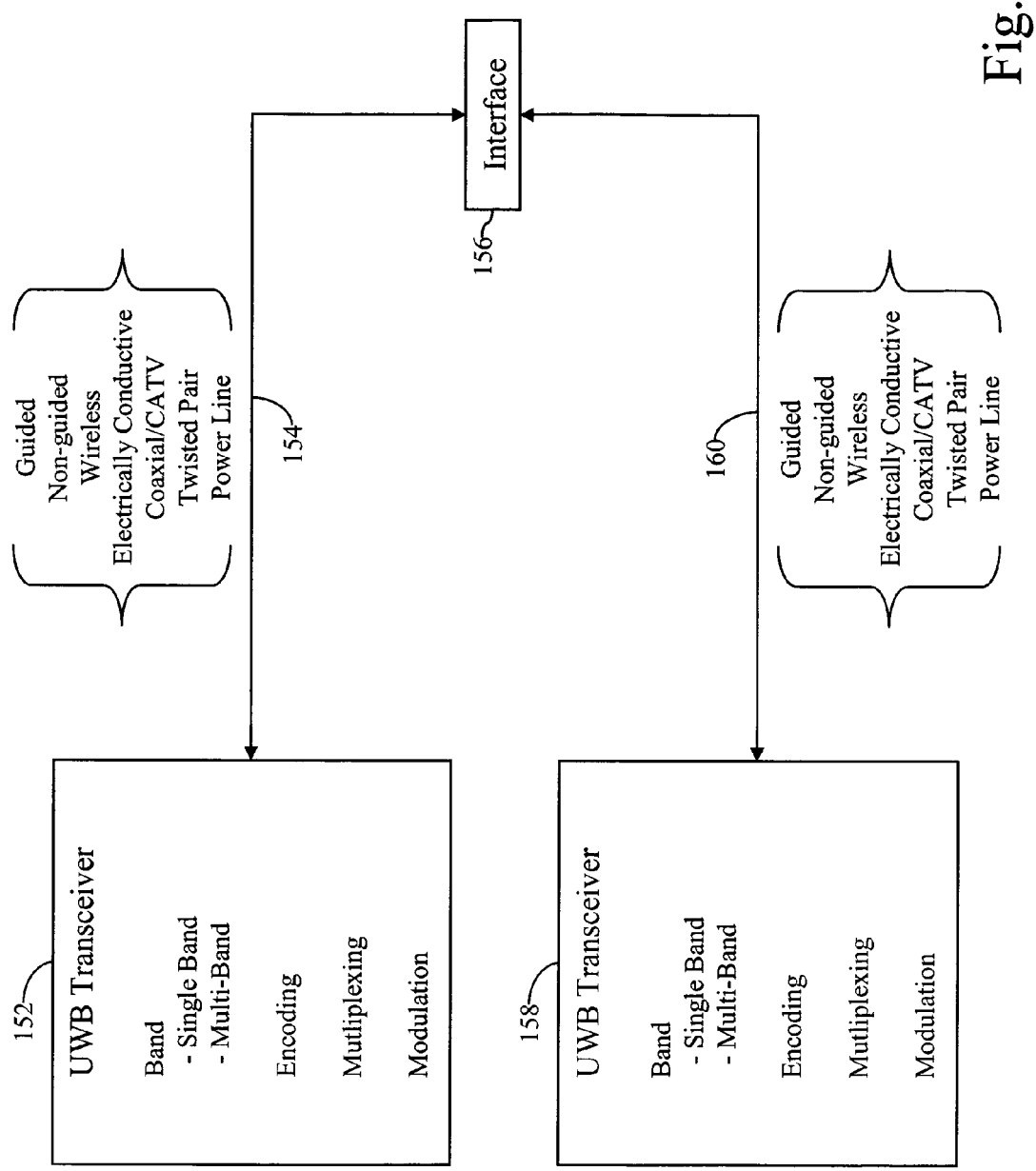
FIG. 10 is a block diagram according to another embodiment of the present invention.

FIG. 10 is a block diagram according to another embodiment of the present invention. In FIG. 10, there is a first UWB transceiver 152 in operative communication across a first medium 154 with an interface 156 and a second UWB transceiver 158 in operative communication across a second medium 160 with the interface 156. The interface 156 is adapted to communicate with both the first UWB transceiver 152 and the second UWB transceiver 158 in order to pass communications back and forth despite, the first UWB transceiver 152 and the second UWB transceiver 158 using different types of UWB communications. For example, the UWB transceivers (152,158) can use different number of bands, different types of encoding, different types of multiplexing, and different types of modulation. The present invention also contemplates that only one of the transceivers (152,158) is a UWB transceiver. When a UWB signal is used it can be of constant or variable length symbols. Also, signals of various directions can be accommodated, including simplex, half duplex, and full duplex. When a multi-band UWB transmission is used, each sub-band may be placed on a separate subcarrier.

The present invention contemplates that the transmission mediums used can be, without limitation, un-bonded telephone twisted pair, bonded telephone twisted pair, coaxial cable, power lines, shielded pair wire, metallic vehicle bodies, structural steel, railroad rail, reinforcing bar, metallic water pipes, metallic pipeline transport, metal desks, computer backplanes, drill stem, the human body, conductive mediums, guided mediums, non-guided mediums, air, and any number of other transmission mediums or combinations of transmission mediums.

One example of a situation where it is desirable for the two UWB transceivers (152,158) to use significantly different types of transmissions is where the UWB transceivers are adapted to communicate across different types of mediums. In particular wireless communication (communication over an air medium which is a non-guided medium) can be significantly different than UWB communication across a guided medium, including, a guided medium such as an electrically conductive medium such as CATV or twisted pair. In such an instance, there is a need to interface between the two types of UWB transmissions. For example, data can be sent through a wired medium to a home or business. Then once at the home, the data can be distributed to devices within the home or business wirelessly. Although both communications links can be performed using UWB, the UWB communications are quite different due to their different environments and contexts. The present invention provides a simple method to perform the necessary interfacing between the two communication links in a manner which is seamless to the ultimate user and in a manner which is efficient and generally inexpensive to implement.

The present invention provides for the use of more than a single sub-carrier to transmit data using ultrawideband pulses. For example, the present invention provides for the grouping of multiple sub-carriers to transmit data into one or more frequency band groups. Any number of types of multiplexing may be used, including frequency division multiplexing and time division multiplexing. The multiplexing can be used to support multiple channels, multiple users, and/or multiple device access over a single frequency channel operating on individual or multiple transmission mediums.

Any number of types of encoding may be used, including QPSK, modulation by polarity, position in time, amplitude, frequency, phase, variable pulse encoding, modulation with pulse compression methods, combinations of polarity, time, amplitude, frequency, and phase, encoding of data or symbols in any of number of bases, and other variations.

The present invention is not to be limited to the specific disclosure provided herein as one skilled in the art having the benefit of this disclosure would appreciate the broad spirit and scope of the invention.

What is claimed is:

1. A method for transmitting information over a first medium, comprising:
    providing a first transceiver configured for UWB communications over the first medium;
    providing a second transceiver configured for UWB communications over a second medium, the second transceiver interfaced to the first transceiver;
    receiving at the second transceiver an incoming UWB communication having a first type of encoding and a first type of modulation;
    communicating information from the incoming UWB communication to the first transceiver;
    allocating for signal transmission by the first transceiver, a plurality of frequency sub-bands of an ultra-wide band spectrum;
    forming an ultra-wide band transmission from a plurality of signals, each of the signals associated with one of the plurality of frequency sub-bands, the ultra-wide band transmission including the information for transmission over the first medium; and
    sending over the first medium the ultra-wide band transmission including the information, the ultra-wide transmission having, a second type of encoding and a second type of modulation, the second type of encoding different from the first type of encoding and the second type of modulation different from the first type of modulation.

2. The method of claim 1 wherein the step of sending is sending over the first medium is sending over air in a wireless transmission.

3. The method of claim 1 wherein the step of sending is sending over a guided medium.

4. The step of claim 3 wherein the guided medium is an electrically conductive guided medium.

5. The method of claim 4 wherein the electrically conductive guided medium is selected from the set consisting of an un-bonded telephone twisted pair medium, a bonded telephone twisted pair medium, a coaxial cable medium, a power line medium, a shielded pair wire medium, a metallic vehicle body medium, a structural steel medium, a railroad rail medium, a reinforcing bar medium, a metallic pipe medium, a metal desk medium, and a computer backplane medium.

6. The method of claim 1 wherein the second medium is of a type different from the first medium.

7. The method of claim 6 wherein the second medium is a guided media and the first medium is a non-guided medium.

8. The method of claim 6 wherein the second medium is a non-guided media and the first medium is a guided medium.

9. The method of claim 6 wherein the first medium is an electrically conductive medium and the second medium is air.

10. The method of claim 6 wherein the first medium is air and the second medium is an electrically conductive medium.

* * * * *